United States Patent
Gidon

(10) Patent No.: US 7,898,931 B2
(45) Date of Patent: Mar. 1, 2011

(54) DEVICE FOR RECORDING DATA, COMPRISING A PERIPHERAL SUPPORT MEMBRANE, AND METHOD FOR PRODUCING SAME

(75) Inventor: Serge Gidon, La Murette (FR)

(73) Assignee: Commissariat a l'Energie Atomique, Paris (FR)

( * ) Notice: Subject to any disclaimer, the term of this patent is extended or adjusted under 35 U.S.C. 154(b) by 902 days.

(21) Appl. No.: 11/794,007

(22) PCT Filed: Dec. 22, 2005

(86) PCT No.: PCT/FR2005/003261
§ 371 (c)(1), (2), (4) Date: Jun. 26, 2007

(87) PCT Pub. No.: WO2006/075066
PCT Pub. Date: Jul. 20, 2006

(65) Prior Publication Data
US 2008/0095021 A1    Apr. 24, 2008

(30) Foreign Application Priority Data
Jan. 17, 2005 (FR) ..................... 05 00471

(51) Int. Cl.
*G11B 9/00* (2006.01)
*G11B 3/00* (2006.01)
*G11B 7/26* (2006.01)

(52) U.S. Cl. .......... 369/126; 369/135; 369/137; 369/287

(58) Field of Classification Search .................. None
See application file for complete search history.

(56) References Cited

U.S. PATENT DOCUMENTS
5,307,311 A    4/1994    Sliwa, Jr.
(Continued)

FOREIGN PATENT DOCUMENTS
EP    0 998 016 A1    5/2000
(Continued)

OTHER PUBLICATIONS

Steven W. Schlosser et al., "Filling the Memory Access Gap: A Case for On-Chip Magnetic Storage," School of Computer Science, Carnegie Mellon University, Pittsburgh, PA, 1999, pp. 1-19.

*Primary Examiner* — Wayne R Young
*Assistant Examiner* — Carl Adams
(74) *Attorney, Agent, or Firm* — Oliff & Berridge, PLC

(57) ABSTRACT

The data recording device comprises a two-dimensional array of microdots of nanometric dimensions arranged facing a storage medium. The storage medium comprises a sensitive area preferably comprising a flexible membrane and extended at its periphery by a flexible fixing membrane. The sensitive area of the storage medium is thus flexibly fixed to an external frame, allowing movement of the sensitive area in its plane and perpendicularly to its plane. The microdots are preferably formed on a convex front face of a substrate, enabling contact between each of the microdots and the sensitive area to be ensured in all cases. The radius of curvature of the convex surface is preferably comprised between 0.5 m and 5 m.

13 Claims, 3 Drawing Sheets

U.S. PATENT DOCUMENTS

| | | | |
|---|---|---|---|
| 5,923,581 A | 7/1999 | Clerc et al. | |
| 7,209,429 B2 | 4/2007 | Gidon et al. | |
| 2002/0067682 A1* | 6/2002 | Carter | 369/118 |
| 2002/0186649 A1* | 12/2002 | Feist et al. | 369/280 |
| 2004/0090893 A1* | 5/2004 | Ootera | 369/53.19 |
| 2004/0252595 A1* | 12/2004 | Someno | 369/44.11 |
| 2005/0269653 A1 | 12/2005 | Gidon | |

FOREIGN PATENT DOCUMENTS

| | | |
|---|---|---|
| EP | 1 168 334 A2 | 1/2002 |
| FR | 2 845 513 A1 | 4/2004 |
| FR | 2 856 184 A1 | 12/2004 |
| WO | WO 2004/032132 A2 | 4/2004 |
| WO | WO 2005/013270 A1 | 2/2005 |

\* cited by examiner

DEVICE FOR RECORDING DATA, COMPRISING A PERIPHERAL SUPPORT MEMBRANE, AND METHOD FOR PRODUCING SAME

BACKGROUND OF THE INVENTION

The invention relates to a device for recording data comprising a two-dimensional array of microdots of nanometric dimensions arranged facing a storage medium and flexible fixing means for fixing a sensitive area of the storage medium onto an external frame allowing movement of said sensitive area in its plane.

The invention also relates to a method for producing such a device.

STATE OF THE ART

In the data recording field, very large storage capacities have recently been achieved by implementing arrays of microdots having an apex of nanometric size. An actuator, which can be electromechanical, enables monolithic relative movement of the whole microdot array with respect to the surface of a medium constituting the storage medium.

In such a data recording device with tip effect, a perfect contact of all the microdots with a sensitive area (recording area) of the storage medium has to be guaranteed. Controlling the position of each microdot individually is not envisageable for system complexity reasons. The microdots are however produced in collective manner by techniques derived from those of microelectronics, and a dispersion of the height of the microdots due to fabrication always remains. Although this dispersion is very small, typically about 100 nm, the longest of the microdots of a lattice presses on the storage medium more than the others.

To overcome this difficulty, each microdot is supported overhanging by one end of a cantilever, in a similar manner to the microdot arrays used in scanning near-field microscopy. The flexibility of the cantilever then enables the stress of a pressing force to be absorbed.

The article "Filling the Memory Access Gap: A Case for On-Chip Magnetic Storage" by Steven W. Schlosser et al., Technical Report CMU-CS-99-174, School of Computer Science, Carnegie Mellon University, published in November 1999, describes cooperation of an array of microdots with cantilevers with a storage medium connected by flexible fixings to a frame integral to the substrate supporting the microdots. The sensitive area of the storage medium can thereby be moved in its own plane by actuators acting in two perpendicular directions. For example, the movement of the storage medium can be about 100 µm in each direction. Elements of millimetric dimensions (storage medium and microdot array) then have to be aligned with nanometric precisions, while at the same time controlling the contact forces, which are in the order of a few nanoNewtons. However the flatness and parallelism of the facing surfaces imply tolerances respectively less than 50 nm and one microradiant. In the above-mentioned article, this is made possible by the use of cantilevers and of a costly dynamic alignment process. In addition, the complex flexible fixings represented in this article, which are of the articulated parallelogram type, require numerous technological steps and are therefore costly. Such a structure may not be strong enough due to the high mechanical stresses exerted at the level of the articulations.

Other solutions have been proposed by the applicant based on the use of a storage medium comprising a membrane the flexibility whereof enables heightwise dispersions of the microdots to be compensated. The microdots can then be formed directly, without cantilevers, on a single base substrate in which the addressing and control circuit can also be integrated. This monolithic production of the addressing and control circuit and of the microdots enables the cost of the device to be reduced.

Thus, the document WO-A-2004/032132 describes a storage medium comprising a flexible membrane supported by a frame forming a plurality of recesses, each recess being associated with at least one microdot. To eliminate edge effects which reduce the occupation rate, the storage medium can comprise a double membrane with imbricated frames.

In the document WO-A-2005/013270, the storage medium comprises a deformable storage layer, for example formed by a flexible layer of polymer, absorbing the heightwise dispersion of the microdots.

Although this approach is efficient for absorbing local heightwise dispersions of the microdots, it does not always enable contact of all the microdots with the storage medium to be ensured, while at the same time mastering the contact forces. This type of problem arises in particular when the front face of the substrate supporting the microdots is partially concave, following deformation thereof during assembly of the device or due to thermal drifts.

OBJECT OF THE INVENTION

The object of the invention is to provide a data recording device that does not present these shortcomings, and more particularly a less expensive device enabling a good contact between the microdots and the storage medium to be ensured.

According to the invention, this object is achieved by a device according to the appended claims, and more particularly by the fact that the flexible fixing means are formed by a flexible fixing membrane extending the sensitive area at the periphery thereof and enabling movement of the sensitive area perpendicularly to its plane.

The sensitive area of the storage medium preferably comprises a flexible membrane, extended at its periphery by the flexible fixing membrane.

The invention also relates to a method for producing such a data recording device and more particularly a production method in which, the sensitive area of the storage medium comprising a flexible membrane, the flexible membrane and the fixing membrane are formed at the same time and in a single part.

BRIEF DESCRIPTION OF THE DRAWINGS

Other advantages and features will become more clearly apparent from the following description of particular embodiments of the invention given for non-restrictive example purposes only and represented in the accompanying drawings, in which.

Figure 2:
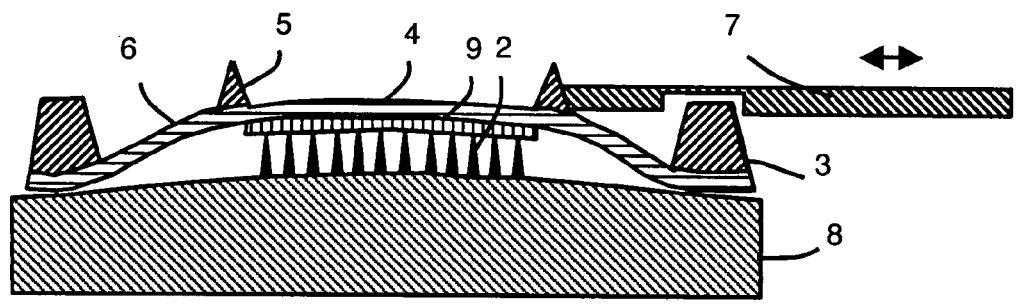

The FIG. 2 illustrates a device according to the invention, in cross-section along A-A, with an associated actuator.

Figure 3:
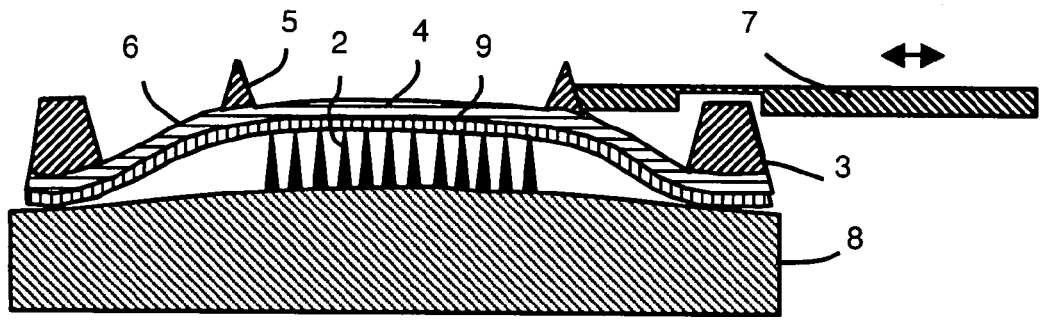
Figure 4:
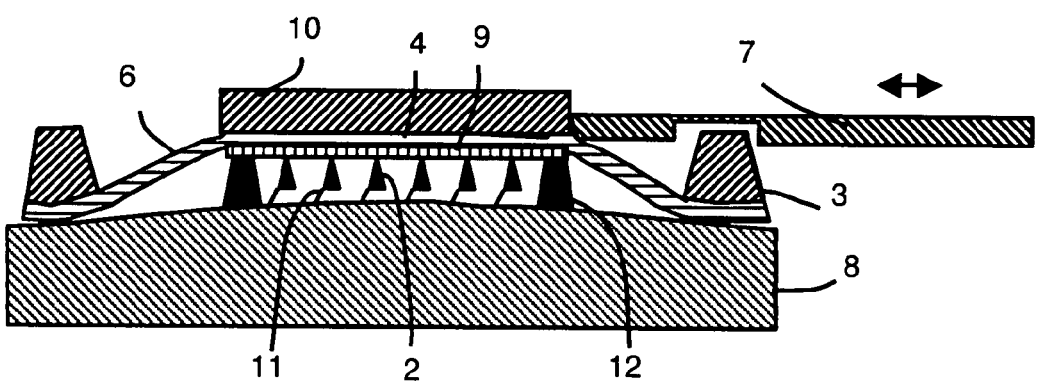

FIGS. 3 and 4 illustrate two alternative embodiments of the device according to FIG. 2, in cross-section.

Figure 1:
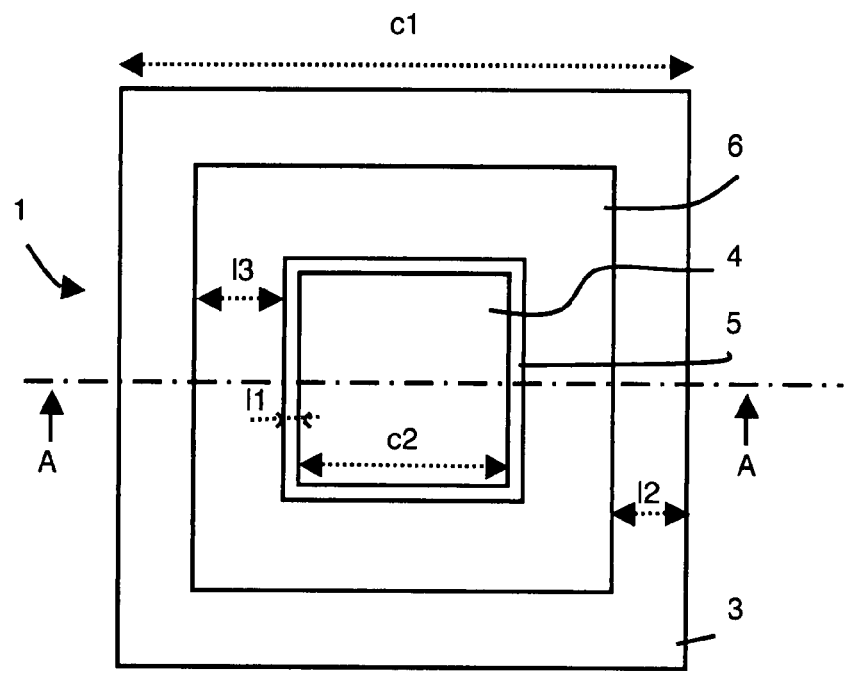
FIG. 1 schematically illustrates a specific embodiment of a storage medium of a device according to the invention, in top view.
Figure 5:
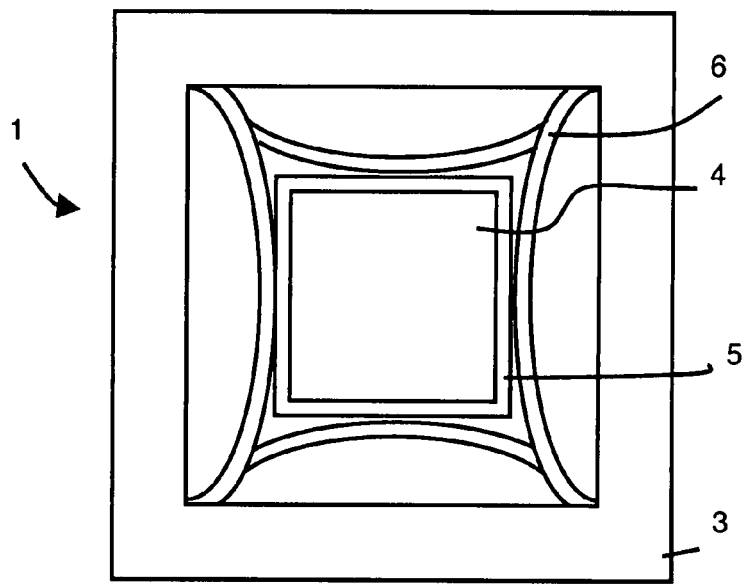

The FIG. 5 illustrate an alternative embodiment of the storage medium according to FIG. 1, in top view.

Figure 6:
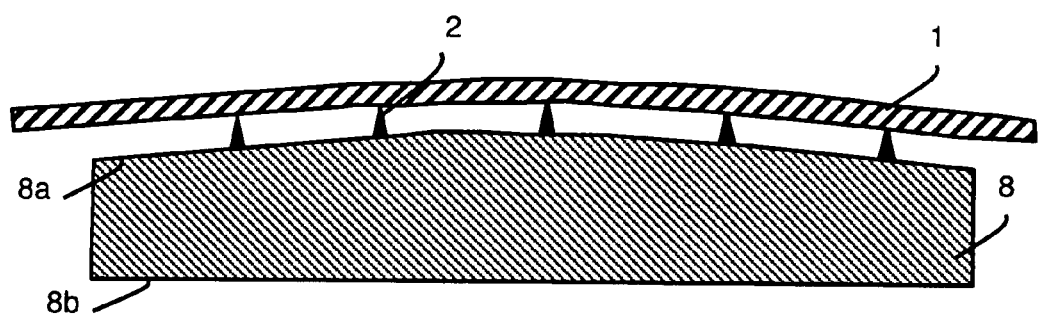
Figure 7:
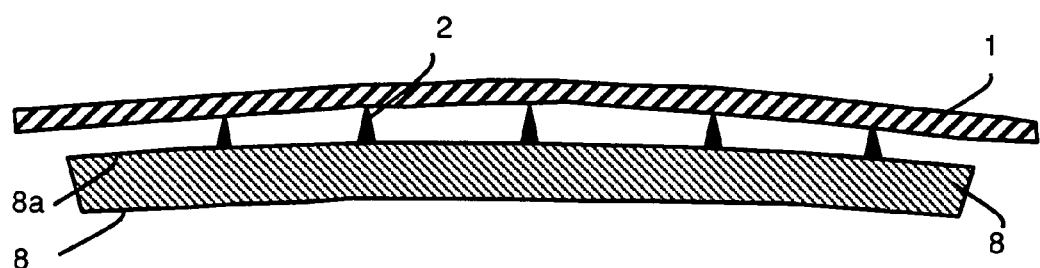

FIGS. 6 and 7 schematically illustrate, in cross-section, two alternative embodiments of a data recording device according to the invention in which the microdots are formed on a convex surface.

DESCRIPTION OF PARTICULAR EMBODIMENTS

The data recording device conventionally comprises a storage medium 1 cooperating with an array of microdots 2. As in the above-mentioned article, the sensitive area of the storage medium 1 is fixed flexibly onto an external frame 3, allowing movement of the sensitive area in its plane.

In FIGS. 1 to 3 and 5, the sensitive area of the storage medium comprises, as in document WO-A-2004/032132, a flexible membrane 4 delineated by an internal frame 5, forming at least one cell. For the sake of clarity, FIGS. 1 and 2 represent a single cell, delineated at the periphery thereof by the internal frame 5. In practice, the cells can be of any number, each cell preferably having a square, rectangular or hexagonal shape and the membrane can be a double membrane with imbricated frames.

As illustrated in FIGS. 1 to 5, the sensitive area of the storage medium is flexibly fixed onto the external frame 3 by a flexible fixing membrane 6 extending the sensitive area, more particularly the flexible membrane 4, at the periphery thereof. Storage layers 9, covering the flexible membrane 4 and possibly also the fixing membrane 6 (FIG. 3) on the front face of the storage medium (designed to come into contact with the microdots), complete the storage medium. In FIGS. 1 to 3 and 5, the membrane 4 is simply delineated by the internal frame 5, and the microdots 2 can be formed directly on a substrate 8. In FIG. 4, on the other hand, the membrane 4 is covered by a support area 10, on the rear face of the storage medium. In the latter case, the sensitive area is semi-rigid, which may require securing of flexible support elements of each of the microdots onto the substrate 8, for example in the form of cantilevers 11. To guarantee a minimum spacing between the storage layers 9 constituting the medium and its read circuit, it may then be desirable to form spacing pads 12 on the substrate 8.

The membranes 4 and 6 can be formed simultaneously in a single part by any suitable method. It is thus possible to deposit a plastic material by spin coating on a silicon wafer constituting the rear face of the storage medium (opposite the front face thereof, which sensitive face is designed to come into contact with the microdots), which material is spread by centrifugal force. The plastic material used is preferably a polymer and more particularly a benzocyclobutene-base (BCB) resin, such as CYCLOTENE™.

After deposition of the plastic material forming the membranes 4 and 6 and possibly the storage layers 9, the external frame 3 and the internal frame 5 or the support area 10 can be obtained in conventional manner (photolithography, dry or chemical etching . . . ). For example, the frames 3 and 5 can be achieved, in the silicon wafer, by anisotropic chemical etching from the rear face of the storage medium through to the layer forming the membranes 4 and 6. The order of these steps (production of the membranes, production of the storage layers, and production of the frames) can be reversed if required depending on the process constraints relating to the materials used.

The storage layers 9 formed on the layer of plastic material can be of any known type, in particular of the type described in document FR-A-2856184.

As represented in FIGS. 2 to 4, the fixing membrane 6 thus constitutes a sort of outside skin which acts as support structure for the sensitive area of the storage medium comprising the flexible membrane 4, while at the same time giving the latter a freedom of movement both vertically to ensure that the sensitive area is pressed against the microdots 2 and horizontally to allow a flexible movement of the sensitive area in its own plane due to the action of actuators 7 operating in conjunction with the internal frame 5 or the support area 10 (a single actuator 7 is represented in FIGS. 2 to 4). The dimensions of the peripheral fixing membrane 6 fix the stiffness thereof. Its thickness is preferably about a few microns and its width is about a few millimeters.

The fixing membrane 6 can be lightened to increase its flexibility. It is in particular possible to reduce the surface of this membrane in an etching step so as to obtain a fixing membrane 6 that is perforated or is in the form of flexible strips, for example curved as in FIG. 5. Etching of the fixing membrane 6 can be performed by any conventional method, and in particular by localized plasma etching by means of a mask or a stencil.

In the above-mentioned documents, the microdots 2 are formed, with or without cantilevers, on the front face of a flat substrate. However deformations of the front face of the substrate are in particular liable to occur during assembly of the device or due to thermal drifts. Such deformations, making the front face of the substrate concave or saddle-shaped, may lead to a lack of contact between the sensitive area of the storage medium 1 and some of the microdots 2.

As represented in FIGS. 2 to 7, this problem is solved by the use of a support substrate 8 of the microdots 2 having a convex front face 8a. The free ends of all the microdots 2 then in fact come into contact with the sensitive area of the storage medium 1, the flexibility whereof is sufficient to absorb at least a large part of the height variations of the microdots. The camber of the front face 8a of the substrate 8 remains slight but sufficient to take account of the deformations liable to occur in the opposite direction during assembly of the device or due to thermal drifts. In practice, the radius of curvature of the convex surface can be comprised between 1 m and 5 m. It is preferably about two meters, which corresponds to a camber of about 10 nm on 100 µm.

Such a camber of the front face of the substrate 8 can in particular be obtained by Chemical Mechanical Polishing (CMP) of the front face 8a before formation of the microdots. In this case, as illustrated in FIGS. 2 to 4 and 6, the rear face 8b of the substrate 8 remains substantially flat.

The camber of the front face 8a can also be obtained by applying a mechanical stress on the substrate 8. This mechanical stressing can for example be achieved by deposition of a compressive stressed thin layer (not represented) on the front face 8a or by deposition of a tensile stressed thin layer (not represented) on the rear face 8b. In both cases, applying such a mechanically compressive or tensile stressed thin layer causes a substantially parallel deformation of the front face 8a and the rear face 8b of the substrate 8, as represented in FIG. 7. In a particular embodiment, the thin layer is a layer of stressed silicon nitride or of stressed silicon with a thickness of a few hundred nanometers which can support a stress of 1 GPa without any adverse effects The stressed layer can in particular be obtained by Ion Beam Sputtering (IBS) deposition. It can also have been previously stressed by another substrate, called original substrate, and transferred to the substrate 8 to be cambered by any suitable transfer technique, for example by bonding and thinning of the original substrate. The thickness of the substrate 8 is advantageously chosen to facilitate the cambering step. For example, the substrate 8 can have a reduced thickness of about 100 µm for example.

When the sensitive area of the storage medium is sufficiently flexible, the microdots 2 can be formed directly, without cantilevers, on the base substrate 8, in which the addressing and control circuit can also be integrated.

As indicated above, the flexibility of the sensitive area of the storage medium 1 comprising the membrane 4 cooperates with the substrate of convex surface to ensure contact between the microdots 2 and the sensitive area and to absorb most of the variations in height of the microdots. The combination of a storage medium according to FIGS. 1 to 5 with a substrate 8 whose front face 8a, bearing the microdots 2, is convex guarantees a good redistribution of the assembly force between all the microdots. When assembly takes place, the external frame 3 can in fact be securely affixed to the substrate 8 while preserving the freedom of movement of the sensitive area in its plane. The external frame 3 can in particular be fixed to the substrate 8 by conventional methods such as bonding, thermofusion or any other method for achieving adhesion between the walls. The assembly force then presses the storage medium, more particularly the sensitive area thereof comprising the flexible membrane 4, onto the array of microdots 2. The elementary force exerted by each microdot 2 can be about 0.1 nN to 10 nN. It is a function of the radius of curvature selected. For example, the assembly force can then be greater than 1 mN.

The data recording device generally comprises means (in particular the actuators 7) enabling relative movement of the sensitive area of the storage medium 1 and of the microdots 2 in the substantially horizontal plane of the sensitive area. It can also comprise means for movement in a direction substantially perpendicular to the support substrate 8 of the microdots (i.e. vertically) to bring the microdots into contact with the sensitive area.

For example, the respective dimensions of the different elements represented in FIG. 1 can be the following:
about 15 mm for the dimension c1 of the storage medium 1,
about 9.5 mm for the dimension c2 of the membrane 4,
about 0.25 mm for the width l1 of the internal frame 5,
about 0.5 mm for the width l2 of the external frame 3 and
about 2 mm for the width l3 of the fixing membrane 6.

The invention claimed is:

1. A data recording device comprising a two-dimensional array of microdots of nanometric dimensions arranged facing a storage medium, and flexible fixing means for fixing a sensitive area of the storage medium onto an external frame allowing movement of said sensitive area in its plane, wherein the flexible fixing means are formed by a flexible fixing membrane extending over the periphery of the sensitive area and enabling movement of the sensitive area perpendicularly to its plane.

2. The device according to claim 1, wherein the sensitive area of the storage medium comprises a flexible membrane extended at the periphery thereof by the flexible fixing membrane.

3. The device according to claim 2, wherein the flexible membrane and the fixing membrane are made of plastic material.

4. The device according to claim 3, wherein the plastic material is a benzocyclobutene-base resin.

5. The device according to claim 1, wherein the fixing membrane is lightened.

6. The device according to claim 1, wherein the microdots are formed directly on a convex front face of a substrate.

7. A method for producing a device according to claim 1, wherein the sensitive area of the storage medium comprising a flexible membrane, the flexible membrane and the fixing membrane are formed simultaneously in a single part.

8. The device according to claim 6, wherein the convex front face has a radius of curvature comprised between 1 m and 5 m.

9. The device according to claim 6, wherein electronic means for addressing and controlling the microdots are integrated in said substrate.

10. The method according to claim 7, wherein the flexible membrane and the fixing membrane are formed by spin coating of a plastic material on a silicon wafer forming a rear face of the storage medium.

11. The method according to claim 10, comprising an etching step to lighten the fixing membrane.

12. The method according to claim 10, wherein the external frame and an internal frame delineating the flexible membrane are achieved by etching in said silicon wafer.

13. The method according to claim 10, wherein the external frame and a support zone of the flexible membrane are achieved by etching in said silicon wafer.

* * * * *